United States Patent [19]
Horiike

[11] Patent Number: 5,805,184
[45] Date of Patent: Sep. 8, 1998

[54] OUTPUT CONTROL APPARATUS AND METHOD THEREFOR

[75] Inventor: Norikazu Horiike, Tokyo, Japan

[73] Assignee: Canon Kabushiki Kaisha, Tokyo, Japan

[21] Appl. No.: 621,883

[22] Filed: Mar. 26, 1996

[30] Foreign Application Priority Data

Mar. 31, 1995 [JP] Japan ................................. 7-076809

[51] Int. Cl.⁶ .............................. B41J 2/21; B41J 2/145; B41B 15/00
[52] U.S. Cl. ............................ 347/43; 347/41; 395/115
[58] Field of Search ................................. 347/43, 41, 5; 346/140 R; 395/115, 116; 358/296

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,163,123 | 11/1992 | Kadono ................................. 395/116 |
| 5,610,634 | 3/1997 | Murata et al. ............................ 347/5 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—Peter S. Wong
*Assistant Examiner*—Rajnikant B. Patel
*Attorney, Agent, or Firm*—Fitzpatrick, Cella, Harper & Scinto

[57] ABSTRACT

When outputting color images bit-mapped in each color to a plurality of output memories according to record information, a flag set in each color by a prescribed range for identifying whether to draw a bit-mapped image in the corresponding output memory is memorized and stored, so that the flag is referred to before each output memory is cleared at each time of bit mapping, and so that determination is made as to whether to clear the output memory.

18 Claims, 14 Drawing Sheets

OUTPUT CONTROL APPARATUS AND METHOD THEREFOR

BACKGROUND OF THE INVENTION

1. Field of the Invention

This invention generally relates to an output control apparatus and, more particularly, to an output control apparatus which controls output means for outputting a color image bit-mapped in each color to a plurality of output memories. Also, it relates to an output control method, particularly including bit mapping. The output control apparatus and method according to the present invention are suitable for several kinds of output control apparatuses such as an information processing apparatus combining functions as word processor, personal computer, facsimile, copy machine and printer.

2. Related Background Art

In conventional output apparatuses, received data is analyzed and converted into a format adapted for inner processing of the output apparatus (hereinbelow, referred to as "record"). The record is made by classifying data according to drawing units such as circle, straight line, character, image and such. The record is drawn as bit images in memories one by one. The memories' contents stored as the bit images are transferred to the output apparatus so that printing can be performed. The memories to which the data is bit-mapped correspond to respective colors of ink or toner incorporated in the output apparatus. For example, a color printer for printing with four colors, namely, yellow Y, magenta M, cyan C, and black K, must be equipped with four memories. In operation, if the output apparatus with such a mechanism receives data for drawing a circle with colors Y and M firstly and a character with a color M secondly, for example, the record will be made according to respective drawings. The record contains graphic information such as "circle, character", color information such as "Y, M", and print position information directing positions for the circle and character. The drawing data are then drawn as bit images in the memories according to the record information. That is, according to the first record information, the circle is drawn as bit images in the memories corresponding to the colors Y and M, respectively. Then, according to the second record information, the character is drawn in the memory corresponding to the color M. In these drawing processes, the other memories for colors not used must be cleared for the purpose of avoiding color mixture. That is, old bit data are cleared from the memories for colors C and K simultaneously at the time of the first drawing in the memories for the colors Y and M, and from the memories for colors Y, C and K simultaneously at the time of the second drawing in the memories for the color M. For this reason, the bit images to be drawn can be displayed or printed out with desired colors just as they were set. If the memory clear processing is omitted, the circle printed with the colors Y and M and the character printed with the color M will be overlapped, so that the color M of the character is mixed with the background color Y, and so that the character can not be printed out with the desired color M just as it was set.

In such a conventional example, however, a problem arises in which the memory clear processing is performed at any time even when it is considered that the memory does not need clearing. For example, when the print positions of the first and second drawing data never overlap each other, i.e., when no old bit image appears in a target memory, no color mixture occurs, so that the memory does not need clearing at the second drawing time (in the above example, the memories for colors C and K do not need clearing).

SUMMARY OF THE INVENTION

The present invention, therefore, is to solve the above problem and an object thereof is to provide an output control apparatus and an output control method capable of omitting unnecessary memory clear processing.

The above object is attained by the provision of an output control apparatus which controls output means for outputting color images bit-mapped in each color to a plurality of output memories according to record information, comprising flag setting means for setting a flag in each color by a prescribed range, the flag identifying whether to draw a bit-mapped image in the corresponding output memory; storage means for memorizing and storing the flag set by the flag setting means; reference means for referring to the flag before each output memory is cleared at each time of bit mapping; and determination means for determining whether to clear the output memory based on the flag reference.

The output means is an ink-jet printing means employing ink-jet heads, for example.

The ink-jet heads are each equipped with an energy generating element utilized for discharging ink, such as an electro-thermal transducer which generates thermal energy so that film boiling of the ink occurs.

The present invention is also attained by the provision of an output control method for controlling output means which outputs color images bit-mapped in each color to a plurality of output memories according to record information, comprising the steps of setting a flag in each color by a prescribed range, the flag identifying whether to draw a bit-mapped image to the corresponding output memory; memorizing and storing the flag set by the flag setting means; referring to the flag before each output memory is cleared at each time of bit mapping; and determining whether to clear the output memory based on the flag reference.

The output control method further includes a print-out step of performing printing according to the data stored in the output memories by ink-jet printing means employing ink-jet heads.

The ink-jet heads are each equipped with an energy generating element utilized for discharging ink, such as an electro-thermal transducer which generates thermal energy so that film boiling of the ink occurs.

According to the present invention, a flag is set in each color by a prescribed range, the flag identifying whether to draw a bit-mapped image in the corresponding output memory. The flag set by the flag setting means is then memorized and referred before each output memory is cleared at each bit mapping time, and this allows the output control apparatus to determine whether the data has been already mapped as a bit image to the output memory. Accordingly, the output control apparatus can be determined as to whether the output memory should be cleared.

As such above, the flag is provided for indicating that the received data has been already mapped as a bit image to the output memory (paint memory), so that the paint memory can remain not clearing until next data is mapped as another bit image thereto by referring to the flag and changing it. Accordingly, access time to the paint memory can be reduced, and this allows the printer to save the processing time effectively.

BRIEF DESCRIPTION OF DRAWINGS

The above and other objects and features of the invention are apparent to those skilled in the art from the following preferred embodiments thereof when considered in conjunction with the accompanied drawings, in which.

DETAILED DESCRIPTION OF THE PREFERRED EMBODIMENTS

Hereinbelow, although the present invention will be described by preferred embodiments, it is apparent to those skilled in the art that the present invention is not limited to such embodiments.

[First Embodiment]

Figure 1:
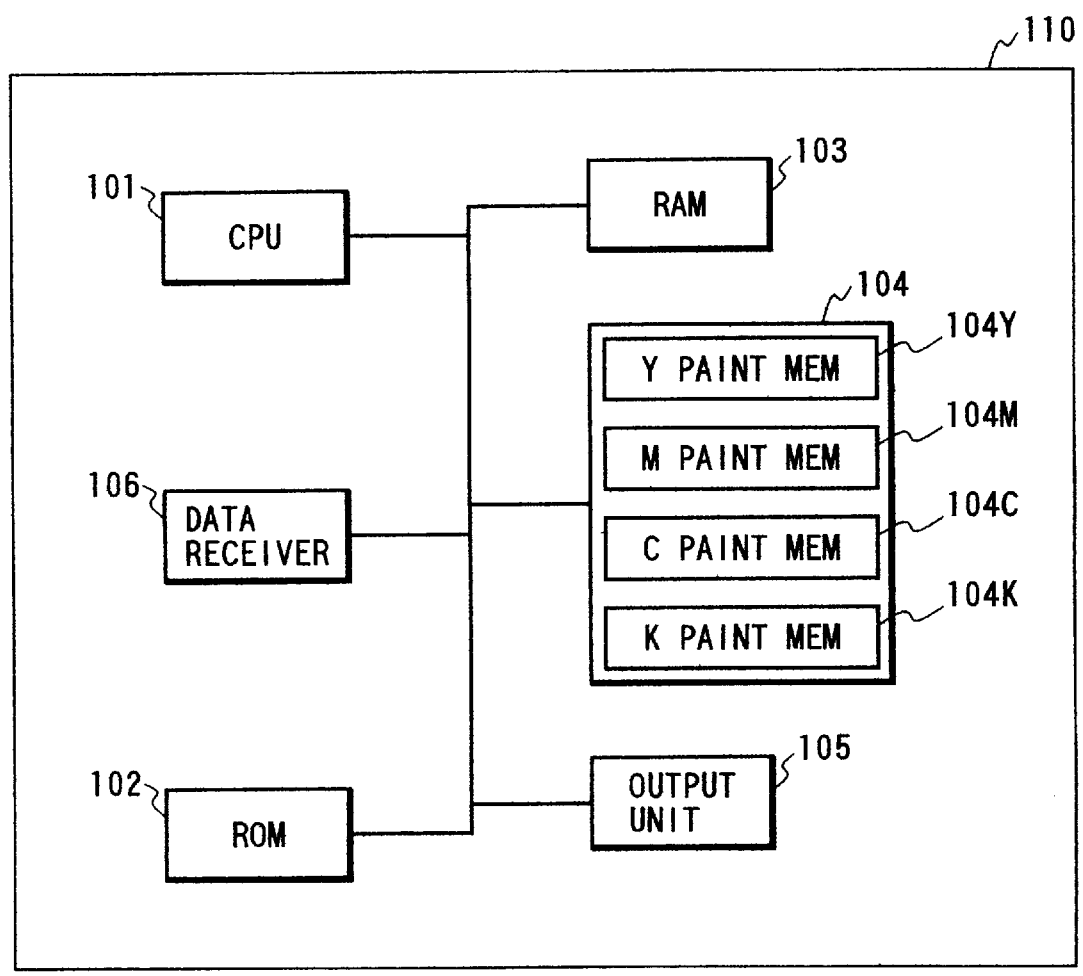
FIG. 1 is a block diagram showing a structural example of a printer system to which the present invention is applied.

FIG. 1 is a schematic block diagram showing a structure of a printing apparatus according to an embodiment of the present invention. In FIG. 1, a reference numeral 110 denotes a printer, the main part of which is constituted of a central processing unit (CPU) 101; a program ROM 102 which stores every kind of program including a program related to flowcharts described later; a RAM 103 which memorizes and stores every kind of variable used in processing steps described later in FIGS. 2 and 4; a paint memory 104 composed of four memories corresponding to colors of ink incorporated in a printer engine where documents or graphics are drawn as bit images, namely, of a paint memory 104Y for yellow (Y), a paint memory 104M for magenta (M), a paint memory 104C for cyan (C), and a paint memory 104K for black (K); and an output unit 105 which receives and prints out the bit images drawn in the paint memory 104 (104Y, 104M, 104C and 104K).

Figure 2:
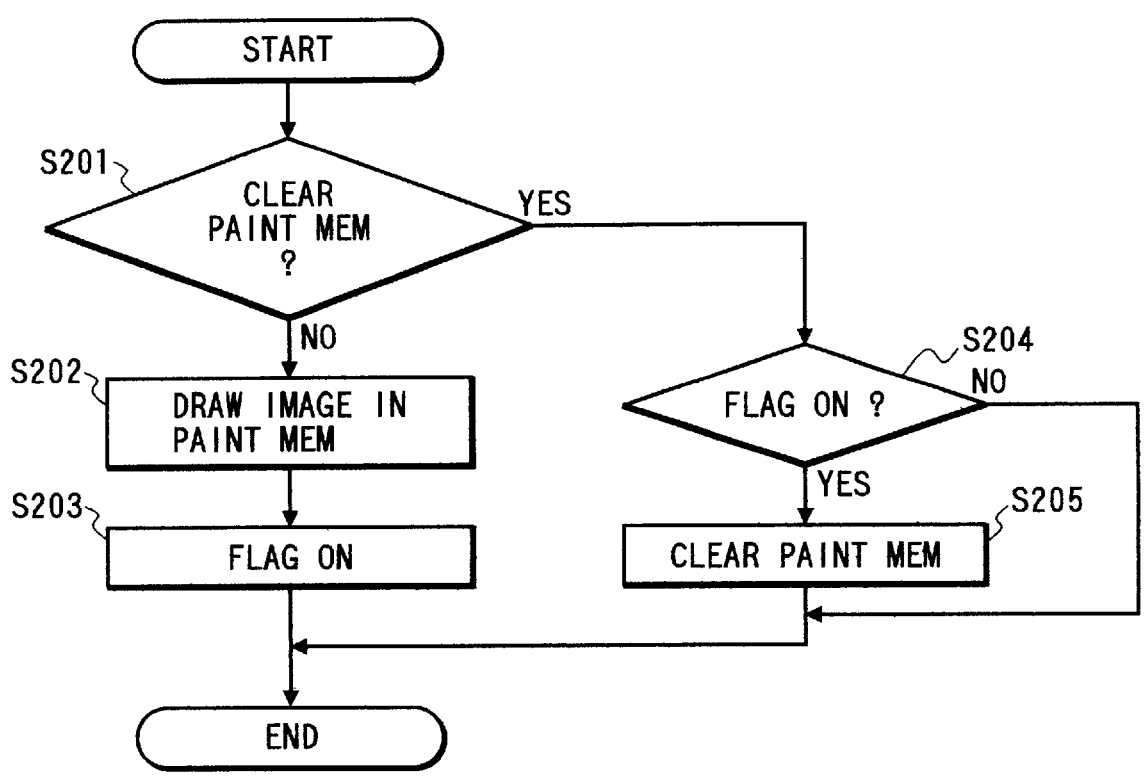
FIG. 2 is a flowchart showing the best of operational features of a first embodiment of the present invention.
Figure 3:
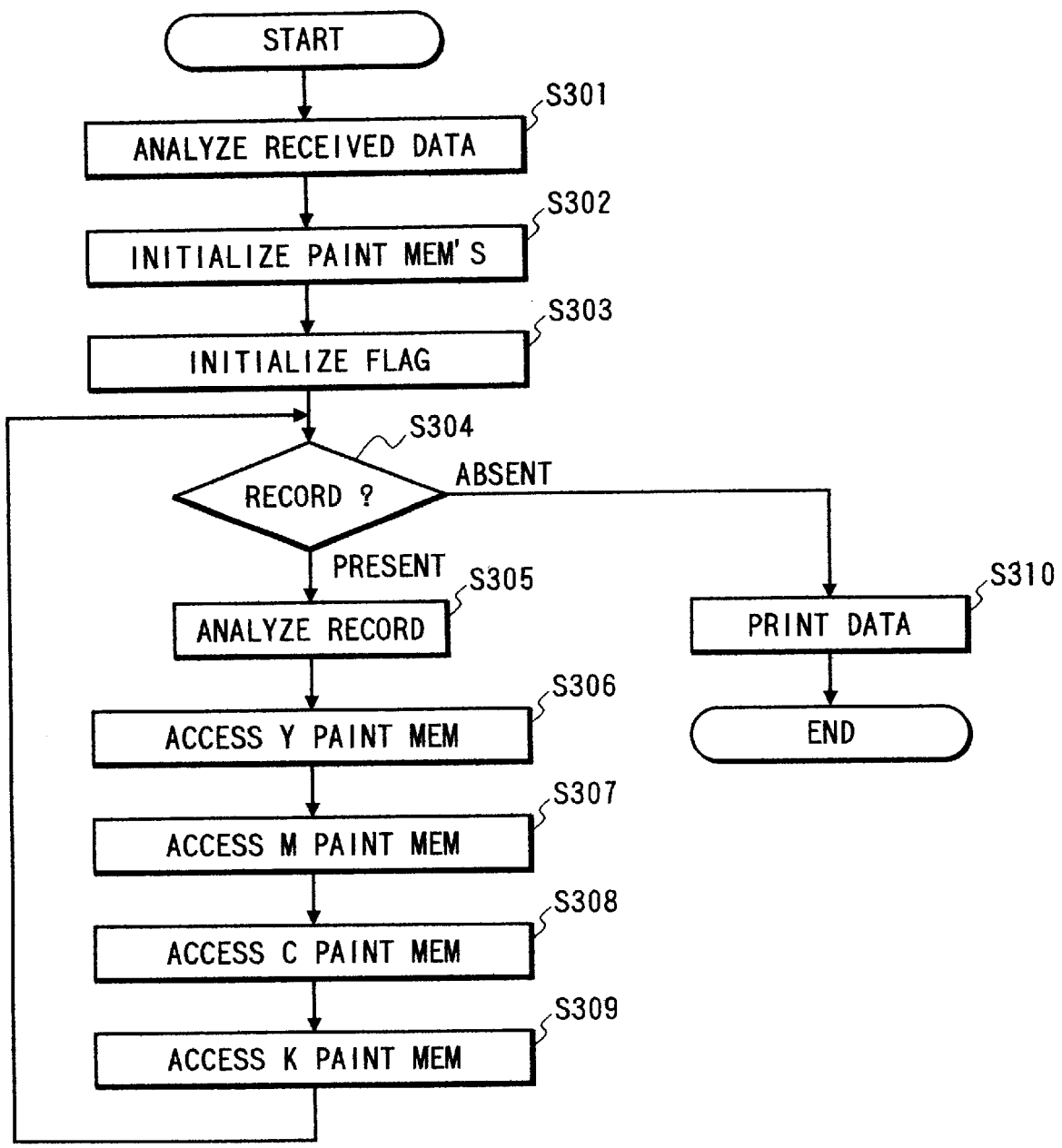
FIG. 3 is a flowchart showing operation of a color printer according to the first embodiment of the present invention.

Referring next to FIGS. 2 and 3, the embodiment will be described. FIG. 2 is a flowchart for describing the best of an operational principle of the output apparatus according to the embodiment, showing processing determined in each process of accessing the paint memory 104Y for color Y, paint memory 104M for color M, paint memory 104C for color C or paint memory 104K for color K. FIG. 3 is a flowchart showing operation of a color printer used as the output apparatus according to the embodiment, utilizing the processing steps of FIG. 2 as a submodule.

Figure 4:
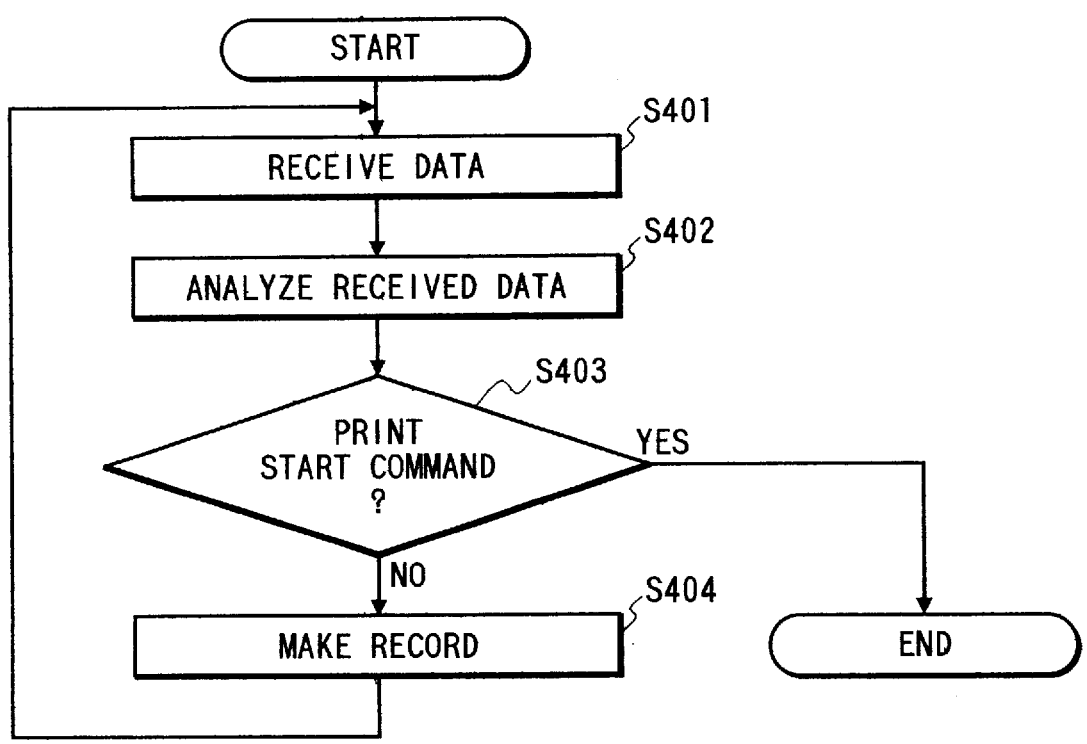
FIG. 4 is a flowchart explaining processing step S301 in FIG. 3.

In FIG. 3, data received by the printer is first analyzed (S301). This command analysis processing, the details of which are shown in FIG. 4, will be described below with reference to FIG. 4. When the printer receives data (S401), a data receiver 106 in FIG. 1 stores the data. The data stored in the data receiver 106 are then analyzed in turn (S402). If the analyzed data is a print start command, the command analysis processing is ended here (S403). If not the print start command, the procedure goes to a step of making a record according to drawing classification (S404). The drawing classification corresponds to drawing functions of the printer, including several types of drawing categories such as circle, character, straight line, rectangle and ellipse. In the record making process, a method of mapping data, by a drawing function, as a bit image to the paint memories 104Y, 104M, 104C or 104K in FIG. 1 is optimized. Here, the record is made in the RAM 103 in FIG. 1. The record includes not only the information of drawing functional classification, but also color information about which color is to be used for the drawing, position information about where the drawing is to be placed and size information about how large the drawing is.

Turning again to FIG. 3, the following processing steps after the command analysis (S301) are described. Firstly, the paint memories 104Y, 104M, 104C and 104K are initialized (S302). The initialization of the paint memories denotes that all the paint memories are cleared so that all bits currently being preset therein are reset to "0", i.e., the paint memories are returned to an initial state so that no drawing data is being drawn therein. Next, paint memory retouch flags are reset so that the flags are initialized (S303). The paint memory retouch flags which have been stored in the RAM 103 in FIG. 1 have one-to-one correspondence to the paint memories 104Y, 104M, 104C and 104K, respectively, so that, if nothing is drawn in a paint memory, the corresponding flag is turned OFF. If data is drawn as a bit image in a paint memory and bits in the memory become ON, the flag is turned ON. Now, the paint memories are initialized and nothing is being drawn in the memories, so that the paint memory retouch flags are all reset to OFF. Then, the record made in the RAM 103 of FIG. 1 in the command analysis process is read and analyzed (S305), and the analyzed data is accessed to the respective paint memories according to the color information included in the record (S306, S307, S308 and S309). If the analyzed record information describes "circle to be drawn with colors Y and M in a certain position", the drawing data is drawn as bit images in the paint memories for colors Y and M, and their memories' bits corresponding to the circle pattern are changed to ON, whereas the paint memories for colors C and K are cleared and their memories' bits corresponding to the circle pattern are changed to OFF.

Alternatively, the drawing with the colors Y and M may be performed after clearing the memories for colors C and K.

The processing steps S306, S307, S308 and S309 in which the record data are accessed to the corresponding paint memories are shown in detail in FIG. 2, so that the following description is made with reference to FIG. 2. As a result of record analysis, determination is made as to whether the record data should be drawn in the paint memories or not, that is, the paint memories should be cleared or not (S201). If the data should be drawn (S202), the paint memory retouch flags corresponding to the colors to be used are changed to ON (S203). The paint memory retouch flags are the same as those initialized in S301 in FIG. 3. If not drawn in the corresponding memories as a result of the determination in the memory clear processing (S201), the paint memory retouch flags are checked (S204). When the corresponding flags are in the OFF state, the paint memory clearing at which corresponding bits in the paint memories are changed to OFF can be omitted because no bit image has been mapped to the paint memories yet at the checking, i.e., the bits in the paint memories are all OFF. Accordingly, the paint memories do not need clearing. If the paint memory retouch flags are in the ON state, since something has been drawn as a bit image at the time of checking so that old and new bit images may be overlapped with each other, the old bit-image pattern overlapped with the drawing target pattern is cleared such that the corresponding bits in the paint memory are changed to OFF (S205).

Turning again to FIG. 3, after end operation of access to all the paint memories, the procedure is returned to the analysis processing step and next record is analyzed. When all the records are analyzed (S304), the paint memories' contents stored by this time are transferred to the output unit 105 in FIG. 1 and printed out (S310).

As described above, a flag is provided for indicating that the received data has been drawn as a bit image in each of the paint memories, so that the clearing of the old bit pattern with which the drawing target pattern is overlapped can be omitted by referring to the flag and changing it. Accordingly, the access time to the paint memory can be reduced, and this allows the printer to save the processing time effectively.

In the above embodiment, although a printer is used as the output apparatus, the same principle can be applied to a display apparatus instead. In this case, the storage means in which documents or graphics are drawn as bit images is VRAM (Video RAM) equipped with memories corresponding to three colors R, G and B, so that this apparatus can output the VRAM's contents on a display.

Further, although the embodiment uses four colors Y, M, C and K for the respective memories, color selection is not limited thereto and, even if the output apparatus makes prints, for example, with three colors Y, M and C, the same effect as aforementioned can be obtained by incorporating three paint memories therein.

Furthermore, the embodiment assumes that a series of processing steps is performed by segmenting, if the size is A4, linear 4096 dots in a direction of y-distance (corresponding to the paper feeding direction) into ranges of 512 dots, but the size of paint memory segmentation can be set variably depending on the available storage capacity.

[Second Embodiment]

A description will be made with respect to a second embodiment in the color printer whose structure is the same as that of FIG. 2. In FIG. 1, a reference numeral 110 denotes a printer, the main part of which is constituted of a central processing unit (CPU) 101; a program ROM 102 which stores every kind of program including a program related to flowcharts described later; a RAM 103 which memorizes and stores every kind of variable used in processing steps in FIGS. 5 to 8; paint memories 104Y, 104M, 104C and 104K corresponding to respective colors of ink incorporated in a printer engine where documents or graphics are drawn as bit images; and an output unit 105 which receives and prints out the bit images mapped to the paint memories 104Y, 104M, 104C and 104K.

Figure 5:
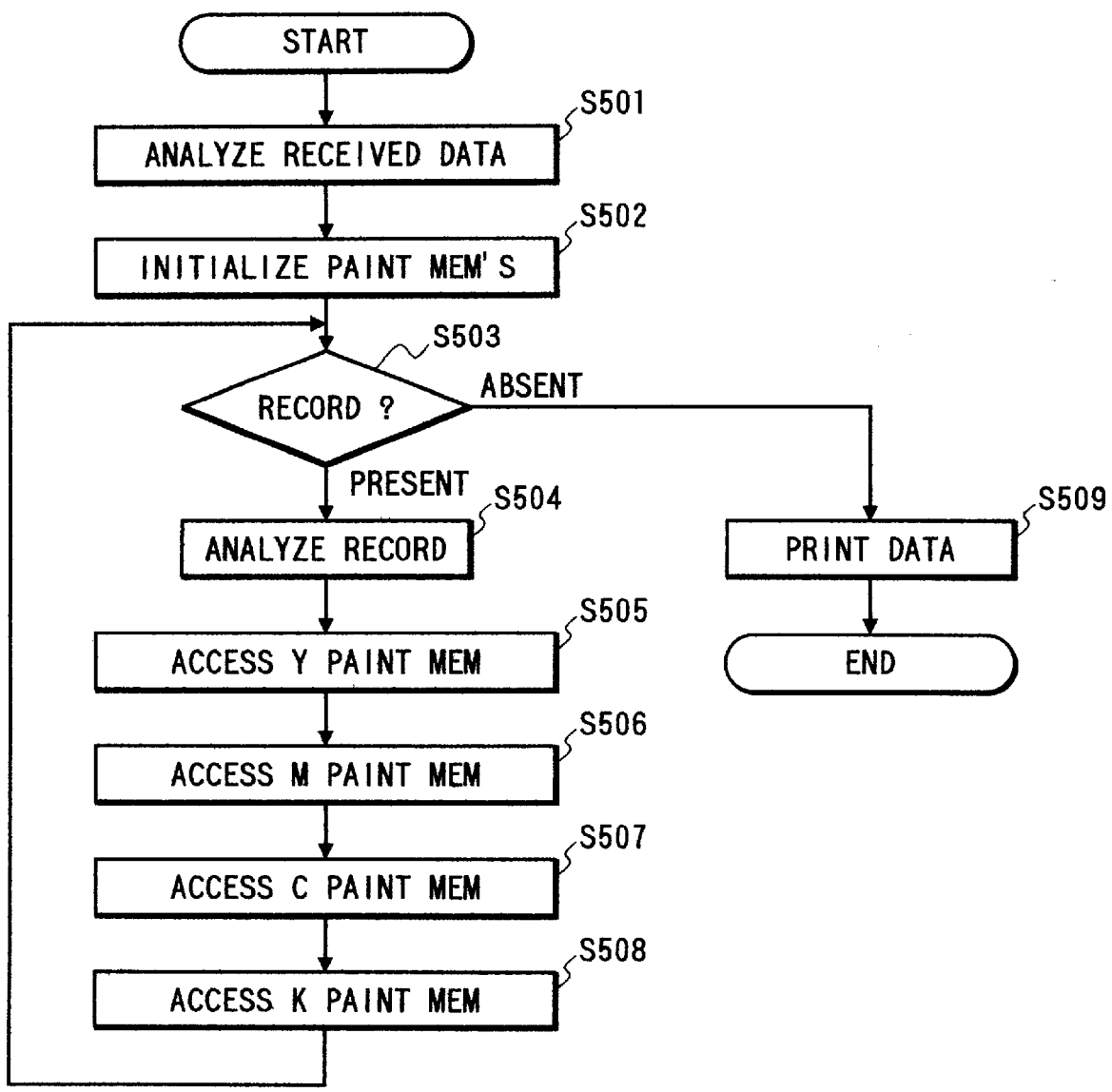
FIG. 5 is a flowchart showing operation of a color printer according to a second embodiment of the present invention.
Figure 6:
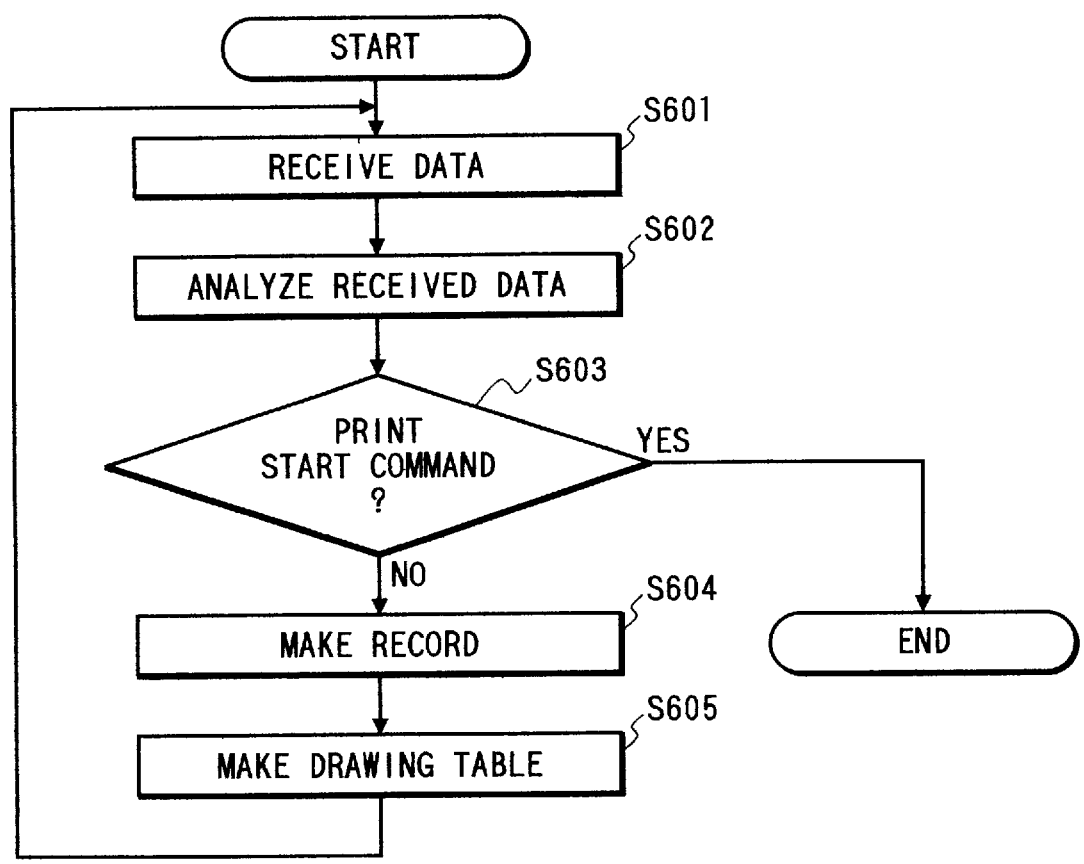
FIG. 6 is a flowchart explaining processing step S501 in FIG. 5.

Referring next to FIG. 5, the embodiment will be described. In FIG. 5, data received by the printer is first analyzed (S501). This command analysis processing the details of which is shown in FIG. 6 will be described below with reference to FIG. 6. When the printer receives data (S601), a data receiver 106 in FIG. 1 stores the data. The data stored in the data receiver 106 are then analyzed in turn (S602). If the analyzed data is a print start command, the command analysis processing is ended here (S603). If not the print start command, the procedure goes to a step of making a record according to drawing classification (S604). The drawing classification corresponds to drawing functions of the printer, including several types of drawing categories such as circle, character, straight line, rectangle and ellipse. In the record making process, a method of mapping data, by a drawing function, as a bit image to the paint memories 104Y, 104M, 104C or 104K in FIG. 1 is optimized. Here, the record is made in the RAM 103 in FIG. 1. The record includes not only the information of drawing functional classification, but also color information about which color is to be used for the drawing, position information about where the drawing is to be placed and size information about how large the drawing is. Then, a table is created for the next record based on the position information and color information (S605).

Figure 7:
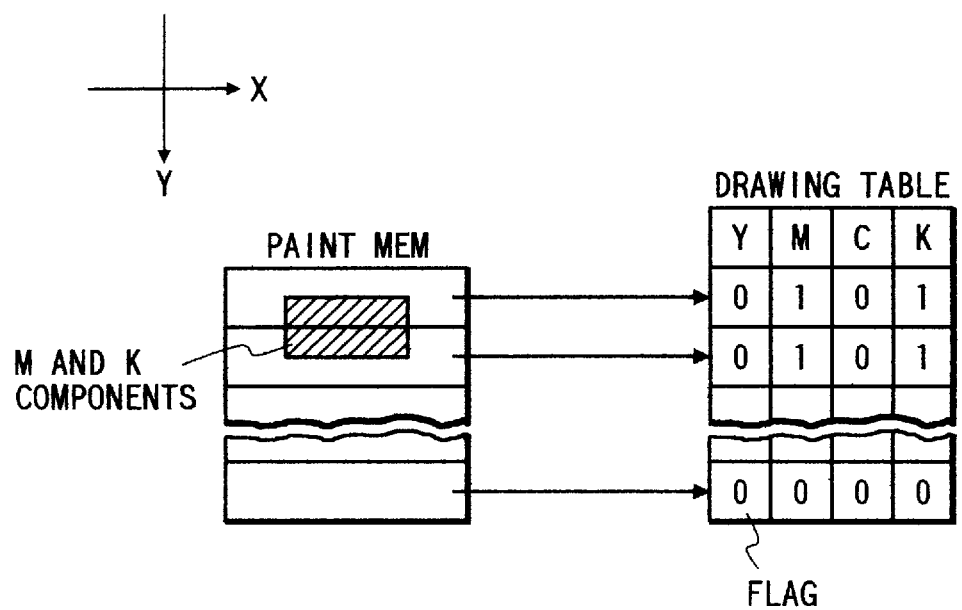
FIG. 7 is a descriptive diagram showing a drawing table structure according to the second embodiment of the present invention.

The drawing table is shown in detail in FIG. 7. Firstly, the paint memories 104Y, 104M, 104C and 104K are segmented in the y direction at equal spaces. The y direction is a direction in a coordinate system in which x indicates a main scanning direction (corresponding to the print head's moving direction) and y is a direction perpendicular to the x direction (corresponding to the paper feeding direction). The size of the segmented unit can be changed freely, but, if the ink-jet heads to be used herein has, for example, 64 nozzles, the paint memories are segmented in each range of 64 dots in the y direction so that the dots in a segmented unit are matched in number to the nozzles. Then, items in the drawing table show one-to-one correspondence to the segmented units in each color. The drawing table is created in a matrix and stored in the RAM 103 in FIG. 1, such that items constituting the matrix express which color is given to the graphic or document to be mapped into each segmented unit (each range of 64 dots in the y direction in this case) of the paint memories.

As such above, in the second embodiment, the drawing table is created in a smaller unit than in the first embodiment, so that the memory clear processing can be omitted more frequently.

The drawing table described above is preset or updated in S605 in FIG. 6. That is, when processing a plurality of records, the color information is set for each record to corresponding items in the drawing table. If nothing is drawn in the paint memories segmented by the drawing table, the flags for the colors Y, M, C and K are all turned OFF. If something is drawn, the flag for the corresponding color is turned ON.

Turning again to FIG. 5, the following processing steps after the command analysis (S501) are described. Firstly, the paint memories 104Y, 104M, 104C and 104K in FIG. 1 are initialized (S502). The initialization of the paint memories denotes that all the paint memories are cleared so that all bits currently being preset therein are reset to "0", i.e., the paint memories are returned to an initial state so that no drawing data is being mapped thereto. Then, the record made in the RAM 103 of FIG. 1 in the command analysis process is read and analyzed (S504), and the analyzed data is accessed to the respective paint memories according to the color information and position information included in the record (S505, S506, S507 and S508). If the analyzed record information describes "circle to be drawn with colors Y and M in a certain position", the drawing data is drawn as bit images in the paint memories for colors Y and M, and their memories' bits corresponding to the circle pattern are changed to ON, whereas the paint memories for colors C and K are cleared and their memories' bits corresponding to the circle pattern are changed to OFF.

Figure 8:
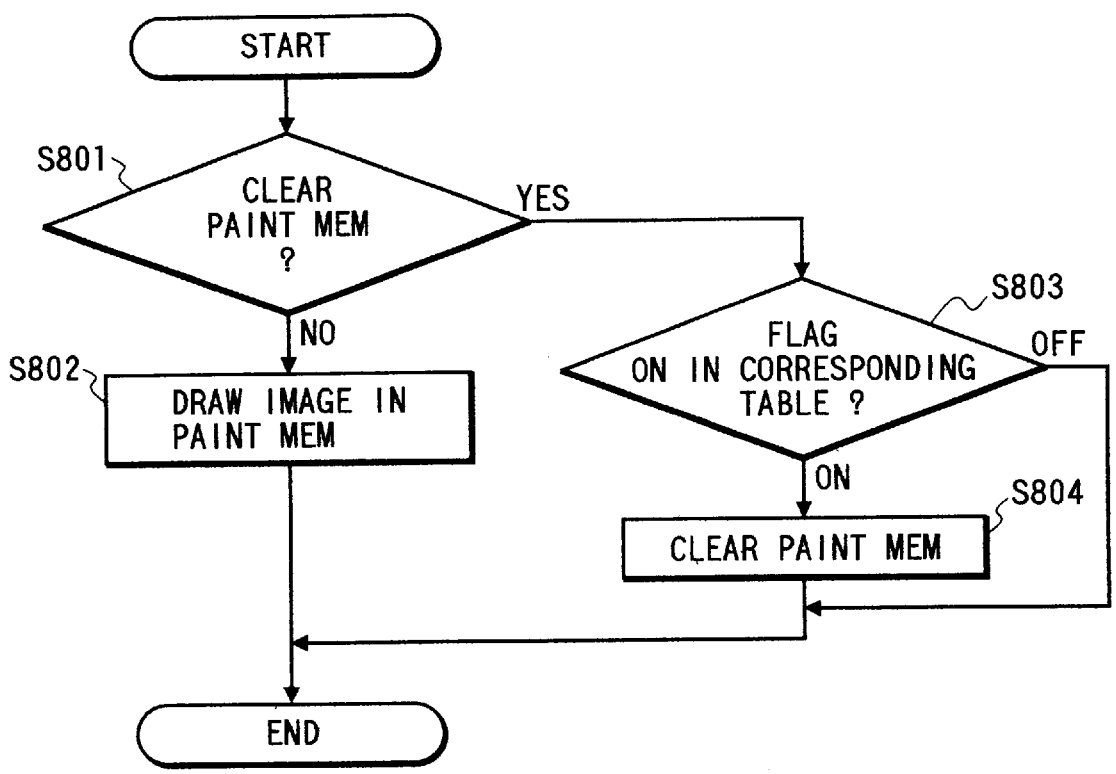
FIG. 8 is a flowchart showing the best of operational features of the second embodiment of the present invention.

The processing steps S505, S506, S507 and S508 in which the record data are accessed to the corresponding paint memories are shown in detail in FIG. 8, so that the following description is made with reference to FIG. 8. As a result of record analysis, determination is made as to whether the record data should be drawn in the paint memories or not, that is, the paint memories should be cleared or not (S801). If not cleared, the record data is drawn as a bit image in the corespondent paint memory (S802). On the contrary, if not drawn in the corresponding memory as a result of the determination in the memory clear processing (S801), the flag in the corresponding drawing table is checked as to the color currently accessed according to the position information in the record (S803). If the flag is in the OFF state, since no bit image has been mapped to the paint memories segmented by the drawing table, i.e., the bits in the paint memories are all in the OFF state so that old and new bit images never overlap each other, the processing of clearing an overlapped bit pattern previously drawn in a paint memory, i.e., the processing in which the drawing target bit pattern in the paint memory is turned OFF can be omitted. Accordingly, the overlapped bit pattern in the paint memory does not need clearing. On the other hand, if the flag is in the ON state, since something has been drawn as a bit image in the paint memory segmented by the drawing table so that old and new bit images may overlap each other, the old bit-image pattern overlapped with the drawing target pattern is cleared such that the corresponding bits in the paint memory are changed to OFF (S804).

Turning again to FIG. 5, after end operation of access to all the paint memories in FIG. 5, the procedure is returned to S503 and next record is analyzed. When all the records are analyzed, all the bit images are transferred to the output unit 105 in FIG. 1 and printed out.

As described above, color information flags are preset in the drawing table corresponding to the segmented paint memories, so that determination can be made as to whether the clearing of the old bit pattern with which the drawing target bit pattern is overlapped should be omitted or not by referring to the flags, thereby accelerating operation time without unnecessary memory clearing.

[Third Embodiment]

A description will be made with respect to a third embodiment in the color printer whose structure is the same as that of FIG. 2. In FIG. 1, a reference numeral 110 denotes a printer, the main part of which is constituted of a central processing unit (CPU) 101; a program ROM 102 which stores every kind of program including a program related to flowcharts described later; a RAM 103 which memorizes and stores every kind of variable used in processing steps in FIGS. 4 to 9; paint memories 104Y, 104M, 104C and 104K corresponding to respective colors of ink incorporated in a printer engine where documents or graphics are drawn as bit images; and an output unit 105 which receives and prints out the bit images mapped to the paint memories.

Referring next to FIG. 3, the embodiment will be described. In FIG. 3, data received by the printer is first analyzed (S301). This command analysis processing, the details of which is shown in FIG. 4, will be described below with reference to FIG. 4. When the printer receives data (S401), a data receiver 106 in FIG. 1 stores the data. The data stored in the data receiver 106 are then analyzed in turn (S402). If the analyzed data is a print start command, the command analysis processing is ended here (S403). If not the print start command, the procedure goes to a step of making a record according to drawing classification (S404). The drawing classification corresponds to drawing functions of the printer, including several types of drawing categories such as circle, character, straight line, rectangle and ellipse. In the record making process, a method of mapping data, by a drawing function, as a bit image to the paint memories 104Y, 104M, 104C or 104K in FIG. 1 is optimized. Here, the record is made in the RAM 103 in FIG. 1. The record includes not only the information of drawing functional classification, but also color information about which color is to be used for the drawing, position information about where the drawing is to be placed and size information about how large the drawing is. Then, a table is created based on the position information and color information (S605).

Turning again to FIG. 3, the following processing steps after the command analysis (S301) are described. Firstly, the paint memories 104Y, 104M, 104C and 104K are initialized (S302). The initialization of the paint memories denotes that all the paint memories are cleared so that all bits currently being preset therein are reset to "0", i.e., the paint memories are returned to an initial state so that no drawing data is being mapped thereto. Next, paint memory retouch flags are reset (S303). The paint memory retouch flags which have been stored in the RAM 103 in FIG. 1 have one-to-one correspondence to the paint memories 104Y, 104M, 104C and 104K, respectively, so that, if nothing is drawn in a paint memory, the corresponding flag is turned OFF. If data is drawn as a bit image in a paint memory so that corresponding bits in the memory become ON, the flag is turned ON. Now, the paint memories are initialized and nothing is being mapped to the memories, so that the paint memory retouch flags are all reset to OFF. Then, the record made in the RAM 103 of FIG. 1 in the command analysis process is read and analyzed (S305), and the analyzed data is accessed to the respective paint memories according to the color information included in the record (S306, S307, S308 and S309). If the analyzed record information describes "circle to be drawn with colors Y and M in a certain position", the drawing data is drawn as bit images in the paint memories for colors Y and M, and their memories' bits corresponding to the circle pattern are changed to ON, whereas the paint memories for colors C and K are cleared and their memories' bits corresponding to the circle pattern are changed to OFF.

Figure 9:
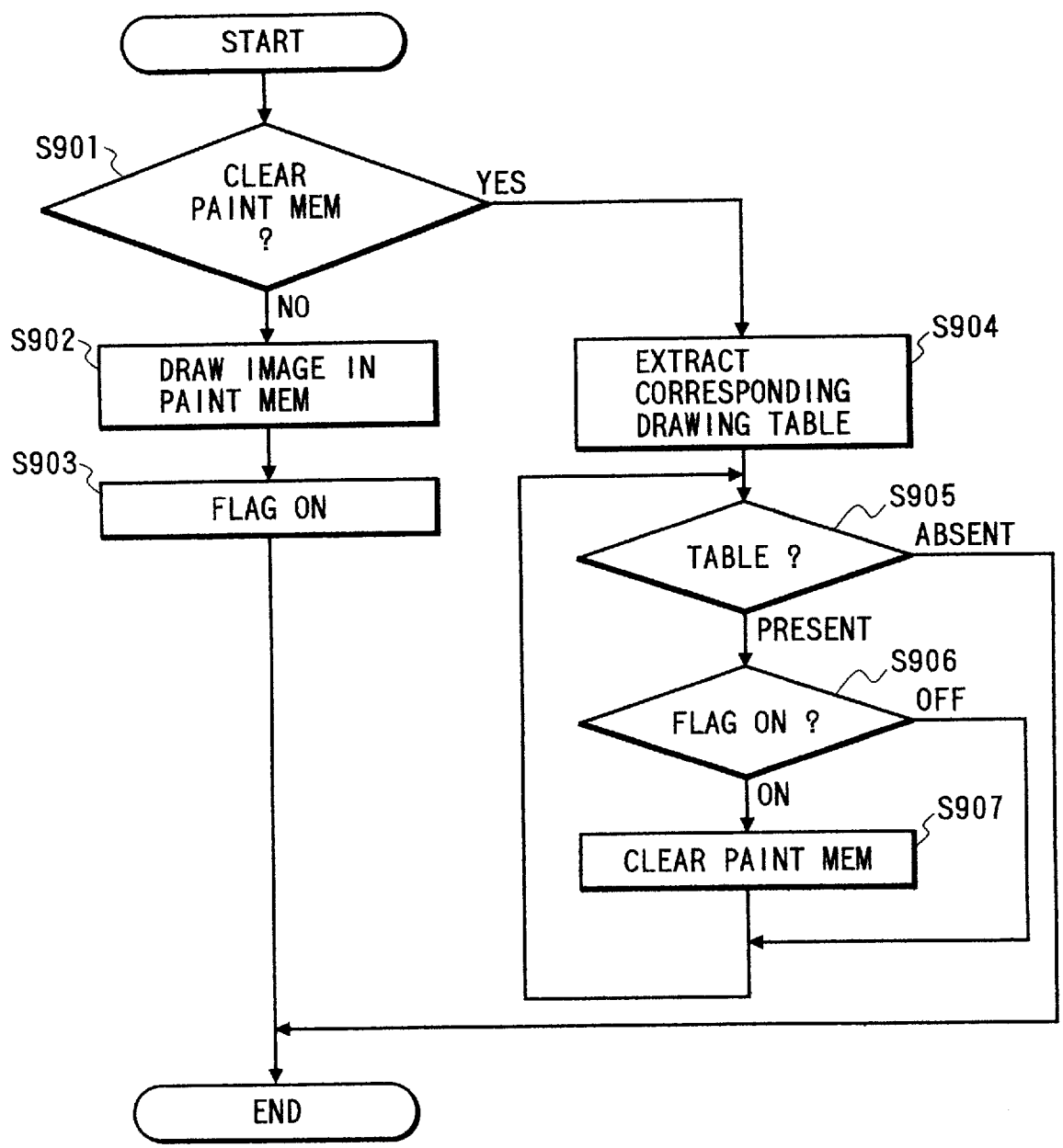
FIG. 9 is a flowchart showing the best of operational features of a third embodiment of the present invention.

The processing steps S306, S307, S308 and S309 in which the record data are accessed to the corresponding paint memories are shown in detail in FIG. 9, so that the following description is made with reference to FIG. 9. In FIG. 9, determination is made first, as a result of record analysis, as to whether the record data should be drawn in the paint memories or not (S901). That is, it is determined whether the paint memories should be cleared or not. As a result, if the data should be drawn (S902), the color flags in the drawing table corresponding to the drawing range are changed to ON (S903).

The drawing table is shown in detail in FIG. 7. Firstly, the paint memories 104Y, 104M, 104C and 104K are segmented in the y direction at equal spaces. The y direction is a direction in a coordinate system in which x indicates a main scanning direction (corresponding to the print head's moving direction) and y is a direction perpendicular to the x direction (corresponding to the paper feeding direction). The size of the segmented unit can be changed freely, but, if the ink jet heads in the ink jet printer have, for example, 64 nozzles, the paint memories are segmented in each range of 64 dots in the y direction so that the dots in a segmented unit are matched in number to the nozzles. Then, items in the drawing table show one-to-one correspondence to the segmented units. The drawing table is created in a matrix and stored in the RAM 103 of FIG. 1, such that items constituting the matrix express which color is given to the graphic or document to be mapped into each segmented unit (each range of 64 dots in the y direction in this case) of the paint memories. That is, in the step S903, the color bits drawn at this time in the segmented range y of the paint memory, i.e., the flags mapped to the corresponding items in the drawing table are changed to ON. For example, when a small character is drawn with color M, if the mapping data is as small as one item in the drawing table at the time of accessing to the paint memory for color M, only one color flag (M) is changed to ON. If a large rectangle is drawn with color C, the flags for the color C corresponding to plural items in the drawing table are changed to ON.

As a result of determination in the step S901, if nothing has been drawn in a paint memory, the procedure goes to the processing step of determining whether to clear the paint memory. In this step, the drawing table corresponding to a range y of the paint memories to which the data is drawn as a bit image is extracted first (S904). The extraction is performed by selecting the corresponding range y based on the position information in the record. Then, if the extracted drawing table has at least one item (S905), the color flag corresponding the item is checked as to ON/OFF (S906). As a result, if the flag is OFF, since no bit image for the corresponding color is being mapped into the range y at this time, i.e., bits in the paint memories are all in the OFF state so that old and new bit images never overlap each other, the processing of clearing an overlapped bit pattern previously drawn in a paint memory, i.e., the processing in which the drawing target bit pattern in the paint memory is turned OFF, can be omitted. Accordingly, the overlapped bit pattern in the paint memory does not need clearing. On the other hand, if the flag for the corresponding color is ON, since something is being drawn as a bit image in the paint memory at this time so that old and new bit images may overlap each other, the old bit-image pattern overlapped with the drawing target pattern is cleared such that the corresponding bits in the paint memory are changed to OFF (S907). Then, the procedure goes to the step of referring to the drawing table corresponding to the next range y.

Turning again to FIG. 3, after end operation of access to all the paint memories, the procedure is returned to the analysis processing step and next record is analyzed. When all the records are analyzed (S304), the contents stored in the paint memories by this time are transferred to the output unit 105 in FIG. 1 and printed out (S310).

As described above, a flag is provided for showing that the received data has been drawn as a bit image in each of the paint memories, so that the clearing of the old bit pattern with which the drawing target bit pattern is overlapped can be omitted by referring to the flag and changing it until something is drawn as a bit image in the paint memory.

Accordingly, the access time to the paint memory can be reduced, and this allows the printer to save the processing time effectively.

In the above embodiment, although a printer is used as the output apparatus, the same principle can be applied to a display apparatus instead. In this case, the storage means in which documents or graphics are drawn as bit images is VRAM (Video RAM) equipped with memories corresponding to three colors R, G and B, so that this apparatus can output the VRAM's contents on a display.

Further, although the embodiment adopted four colors Y, M, C and K for the respective memories, color selection is not limited thereto and, even if the output apparatus makes prints, for example, with three colors Y, M and C, the same effect as aforementioned can be obtained by incorporating three paint memories therein.

[Fourth Embodiment]

Figure 10:
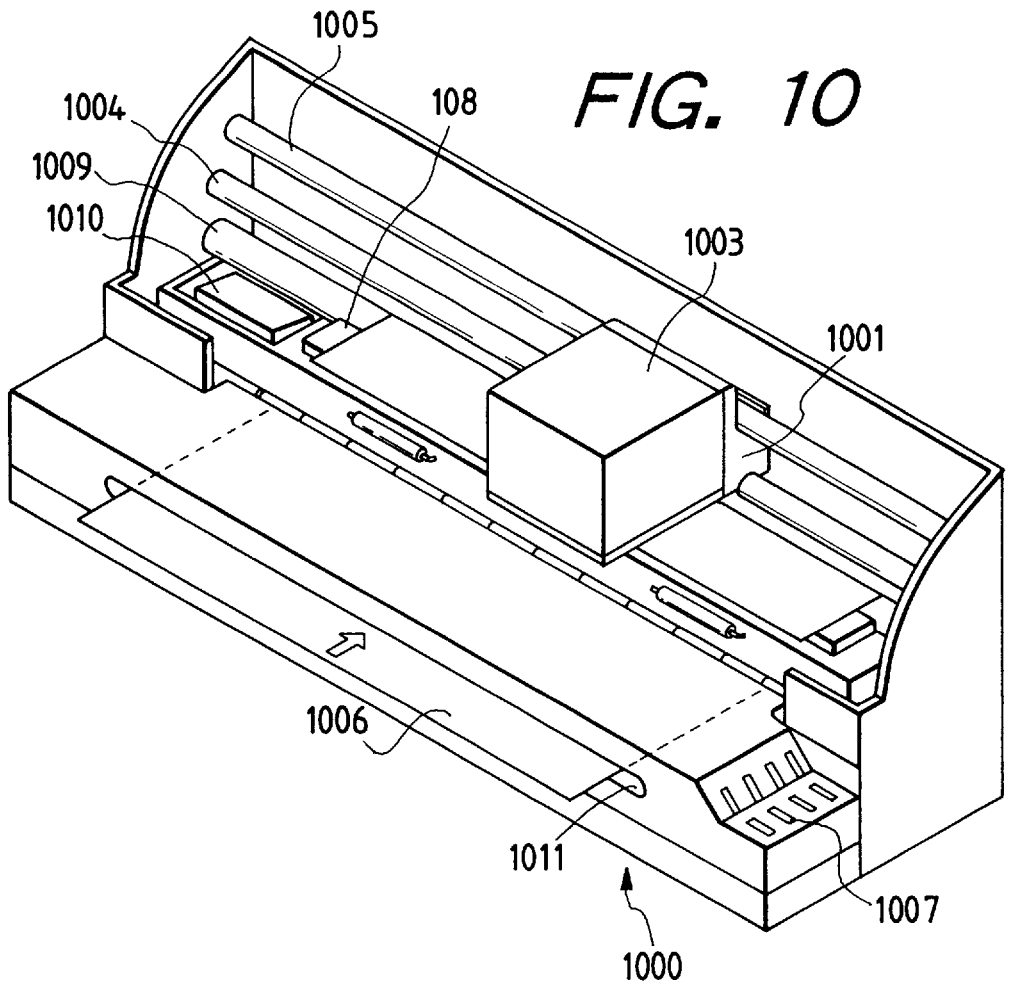
FIG. 10 is a schematic perspective view of an ink-jet printer to which an embodiment of the present invention is applied.

FIG. 10 is a schematic perspective view of an ink-jet printer according to an embodiment of the present invention.

In the ink-jet printer 1000, a carriage 1001 is slidably engaged with two guide shafts 1004 and 1005 extending parallel to each other, so that the carriage 1001 can be moved along the guide shafts 1004 and 1005 by a driving power transmission mechanism mainly including a driving motor and a driving belt operative to transmit the power of the driving motor, both not shown.

Then, an ink-jet unit 1003 is mounted on the carriage 1001, the ink-jet unit 1003 including ink-jet heads and ink containers or ink tanks for containing ink to be used in the heads. The ink-jet unit 1003 is constituted of the heads for discharging ink and liquid additives used to improve printability, and the containers or tanks containing the ink and the liquid additives supplied to the heads. That is, four ink-jet heads discharging ink of four colors, namely, black (K), cyan (C), magenta (M) and yellow (Y), and four tanks provided for the four ink-jet heads are mounted as the ink-jet unit 1003 on the carriage 1001. Each head and tank can be attached to and removed from each other and, if a tank has run out of the ink or additive solution, only the corresponding tank need be replaced with a new tank as required. Of course, each head can be also replaced as required. The attachment and removal of the head or tank is not limited to such above and, for example, the head and tank unitarily formed can be used as well.

The improvement of the printability by the additive solution, as described later according to an example, includes improvement of image quality such as gray scale, brightness, edge sharpness, and dot size, and improvement of weather resistance or shelf life of the image such as water resistance and light resistance.

In operation, a paper to be used as a printing medium 1006 is inserted from an inserting port 1011 provided on the front side of the printer and carried by the feed roller 1009 to the lower portion of the moving range of the carriage 1001, the paper finally inverting its traveling direction. Thus, the heads mounted on the carriage 1001 can print out images in a print region on the paper 1006 supported by a platen 1008 as the carriage 1001 moves right and left.

As such above, printing operation in a line having a predetermined width corresponding to that of an arrangement of the nozzles on the heads repeatedly alternates with feeding operation of the paper 1006. Then, the paper 1006 is ejected from the front side of the printer after end operation of printing the overall length of the paper 1006.

A recovery unit 1010 is provided at the left end of the movable range of the carriage 1001 so as to be opposite to the lower end portion of each head on the carriage 1001. The recovery unit 1010 is operative to cap the ink-jet port of each head at an idle time when the recording is not performed and to suck the ink from the ink-jet port. The left end of the movable range of the carriage 1001 at which the recovery unit 1010 is located is set as a home position for the heads.

On the other hand, a console 1007 having necessary switches and display elements thereon is provided in the right end portion of the printer. The switches are used to turn the power supply ON/OFF and to select a print mode; the display elements are used to display the printer status in prescribed processes.

Figure 11:
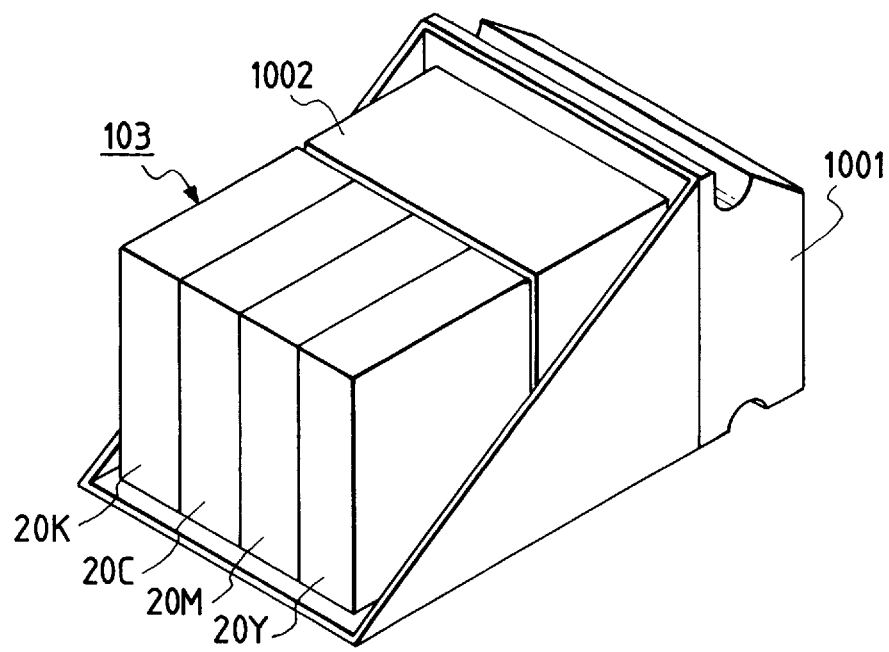
FIG. 11 is a schematic perspective view of an ink-jet unit shown in FIG. 10.

FIG. 11 is a schematic perspective view showing the ink-jet unit 1003 in FIG. 10. In this structure, the tanks for the additive solution and ink with respective colors, namely, black (K), cyan (C), magenta (M) and yellow (Y) are provided so that each tank can be individually replaced with new one.

A head case 1002 for holding the heads attachable and removable individually, and tanks 20K, 20C, 20M and 20Y respectively for colors K, C, M and Y are mounted on the carriage 1001. Then, the heads 30K, 30C, 30M and 30Y (not shown) for discharging ink with colors K, C, M and Y, respectively, are accommodated in the head case 1002. Each head has, for example, 160 ink-jet ports capable of discharging ink of 40 ng, each. The heads are coupled through couplings to the respective tanks from which the ink and additive solution are supplied.

Alternatively, the tanks for colors C, M and Y may be formed unitarily depending on the amount of the ink to be used.

Figure 12:
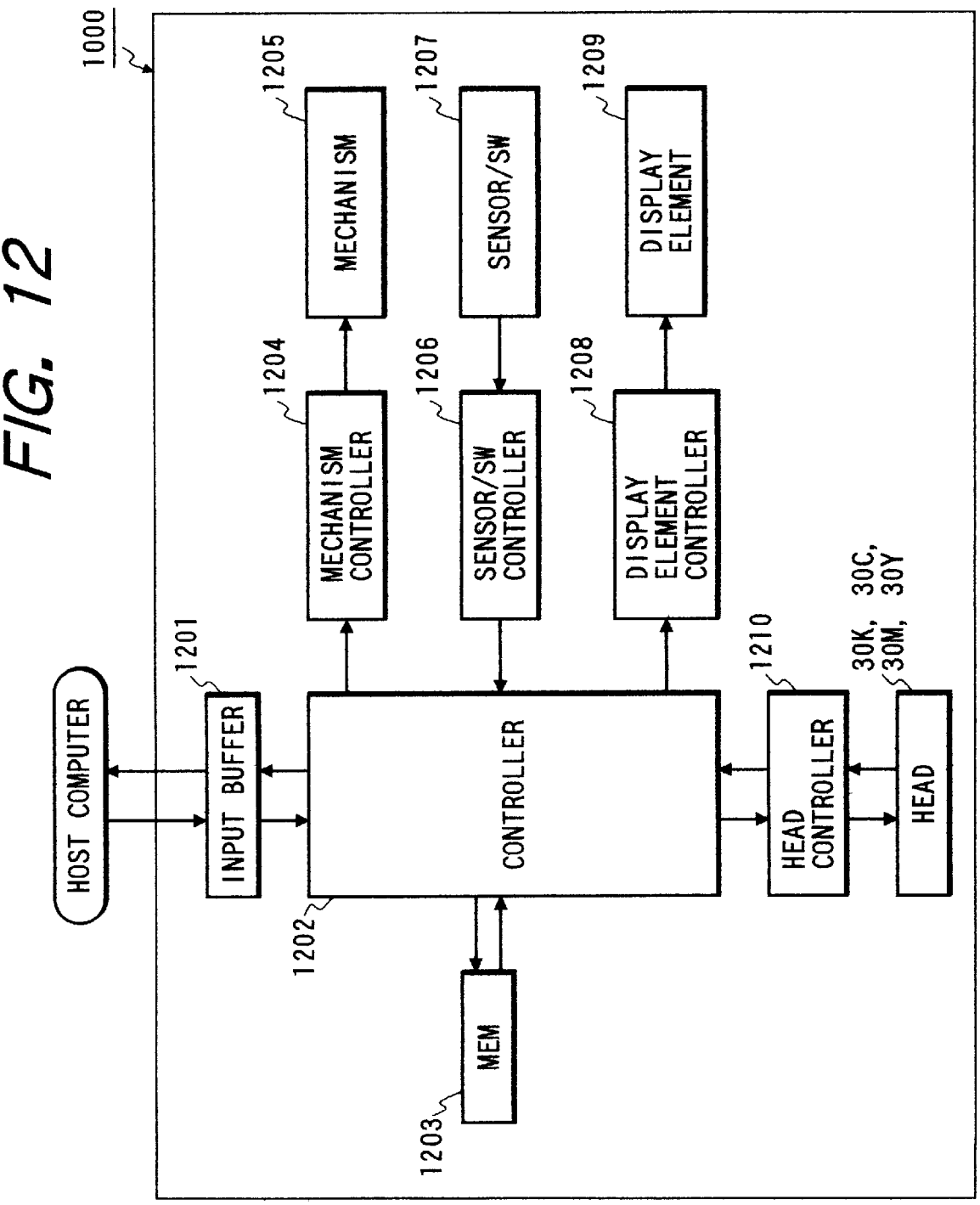
FIG. 12 is a block diagram showing a control structure of the ink-jet printer.

FIG. 12 is a block diagram showing a control structure of the ink-jet printer according to the embodiment. In operation, character or image data to be printed (hereinbelow, referred to as image data) is input from a host computer to an input buffer 1201 in the output apparatus 1000. On the other hand, data for confirming that the data transfer is being performed correctly and data for informing of an operational state of the output apparatus are transferred from the printer to the host computer. The data received by the input buffer 1201 is transferred to a RAM type memory 1203 for temporarily storing the data under the control of a controller 1202 including the CPU and the ROM which stores, e.g., the program related to flowcharts described above. The controller 1202 also instructs a mechanism controller 1204 to actuate mechanism portion 1205 such as a carriage motor for supplying power to the carriage 1001 and the feed roller 1009 (see FIG. 10), a line feed motor and such. A sensor/SW controller 1206 is operative to send a signal output from a sensor/SW portion 1207 composed of sensors and SWs (switches) to the controller 1202. The controller 1202 instructs a display element controller 1208 to control a display element portion 1209 constituted of a display panel group including LEDs and liquid display elements. The controller 1202 also instructs a head controller 1210 to control the heads 30K, 30C, 30M and 30Y individually, whereas the head controller 1210 reads out head status information such as temperature and informs the controller 1202 of the information.

[Others]

Although the present invention can be applied to different kinds of ink-jet type recording systems, it especially displays an excellent effect on a recording apparatus with a recording head including means for generating thermal energy to be used for discharging ink, such as electro-thermal transducer or laser beam, so that the state of the ink can be changed. If the present invention is applied to such a system, the recording can be performed with higher density and finer image quality.

A typical example of such a system is preferably designed based on a structure and an operational principle, for example, disclosed in a specification of U.S. Pat. Nos. 4,723,129 or 4,740,796. This system is applicable to both types of systems, namely, so-called on-demand type and continuous type. In case of the on-demand type, at least one driving signal corresponding to recording information is applied to the electro-thermal transducer arranged correspondingly to a sheet or a liquid passage in which a liquid (ink) is held, so that a sudden temperature rising above a core boiling temperature occurs. The application of the driving signal causes the electro-thermal transducer to generate thermal energy, so that film boiling occurs on the surfaces of the recording heads to be thermally acted. As a result, air bubbles can be formed in the liquid (ink) having one-to-one correspondence to the driving signal. The bubbles growing and shrinking cause a discharge of the liquid (ink) through a liquid-discharging opening so that at least one drop of the liquid can be formed. Where the driving signal is a pulsed signal, the bubbles growing and shrinking are performed properly at once, and this allows the discharge of the liquid (ink) with an excellent response. Accordingly, the present invention is applied more preferably to the system of on-demand type than continuous type.

A pulsed driving signal suitable for such a system is disclosed, for example, in a specification of U.S. Pat. Nos. 4,463,359 or 4,345,262. Notedly, if the conditions described in a specification of U.S. Pat. No. 4,313,124 whose claimed invention relates to a temperature rising rate on the surface thermally acted are utilized in the system according to the present invention, the recording can be performed more properly.

The recording head according to the present invention can be constituted not only by using a discharge port, a liquid passage and an electro-thermal transducer in combination (where the liquid passage connects the discharge port linearly or perpendicularly to the electro-thermal transducer) as disclosed in the above specifications, but also with a construction such that a thermally acted portion is arranged in a bent region as disclosed in a specification of U.S. Pat. Nos. 4,558,333 or 4,459,600. Also, the present invention can properly adopt other types of recording heads such as constructed based on a disclosure of Japanese Patent Laid-Open Application No. 59-123670, in which a slit common to a plurality of electro-thermal transducers is used as a discharge port for all the electro-thermal transducers, and a disclosure of Japanese Patent Laid-Open Application No. 59-138461, in which an aperture corresponding to the discharge port is provided for absorbing pressure waves of the thermal energy. In other words, the present invention can perform recording securely and efficiently regardless of the form of the recording head to be used.

Further, the present invention can properly adopt a full-line type recording head, the recording length of which corresponds to the maximum width of a recording medium on which the recording apparatus performs recording. The recording head of this type may be constructed either by using a plurality of recording heads to meet the recording length required, or with a recording head unitarily formed.

Furthermore, the present invention may adopt recording heads of other different types, in addition to the serial type recording heads as aforementioned, such as a chip-type recording head which is removably attached to the recording apparatus so that the recording head can be electrically connected to the recording apparatus from which ink is supplied to the recording head, and a cartridge type recording head which equips an ink tank in the recording head itself.

It is preferable to add recovery means and optional auxiliary means to the recording head to be incorporated in the structure according to the present invention because these means are useful to make the effect of the present invention more stable. As concrete examples of these means, capping means for capping the recording head, cleaning means; pressurization/suction means; preliminary heating means constituted with either an electro-thermal transducer or a heating element other than the electro-thermal transducer, or by using the electro-thermal transducer and the heating element in combination; and means for discharging ink in a preliminary ink discharging mode different from that for recording are cited to effectively perform a stable recording.

The type or number of the recording heads to be mounted may be either only one corresponding to one color, or plural for plural colors different in recording color or gray scale from each other. That is, the present invention can be effectively applied to not only a recording apparatus having a recording mode for a main color only such as black, but also a recording apparatus for performing multicolor recording with plural colors or full-color recording by mixing colors with each other. The latter recording apparatus for multicolor or full-color recording may be provided with either a recording head unitarily formed or a plurality of recording heads used in combination.

Although the above embodiments described the ink as a liquid, any other ink may be adopted as long as it is liquid at the time of application of the recording start signal because the ink to be used for recording is generally solid at room temperature or below and becomes soft or liquefies at room temperature, or in ink-jet systems, the temperature of the ink is generally controlled to be adjusted within 30° C. to 70° C. so that the ink viscosity lies within a range capable of being stably discharged. The present invention can also adopt other types of ink which liquefy only by thermal energy, such as to liquefying due to supply of the recording signal by the thermal energy so that the liquid ink can be discharged either by actively using the thermal energy as energy for changing the ink from a solid state to a liquid state so that the temperature rising by the thermal energy can be effectively prevented, or by using ink solidifying in a condition of being left in air for the purpose of preventing the ink from evaporating, and such as to begin solidifying just before the ink reaches the recording medium. The ink of such types, as disclosed in Japanese Patent Laid-Open Application No. 54-56847 or 60-71260, may be held as liquid or solid in a concave portion or penetrating hole of a porous sheet so that the ink is located opposite to the electro-thermal transducer. It is noted that ink of the film boiling type mentioned above is most suitable for the present invention.

In the present invention, the recording apparatus with the recording mechanism employing the liquid spraying type recording head(s) may be adapted for not only an image output terminal in an information processing apparatus such as computer, but also a copy machine used with a reader in combination, and a facsimile having a transmitter-receiver function.

Figure 13:
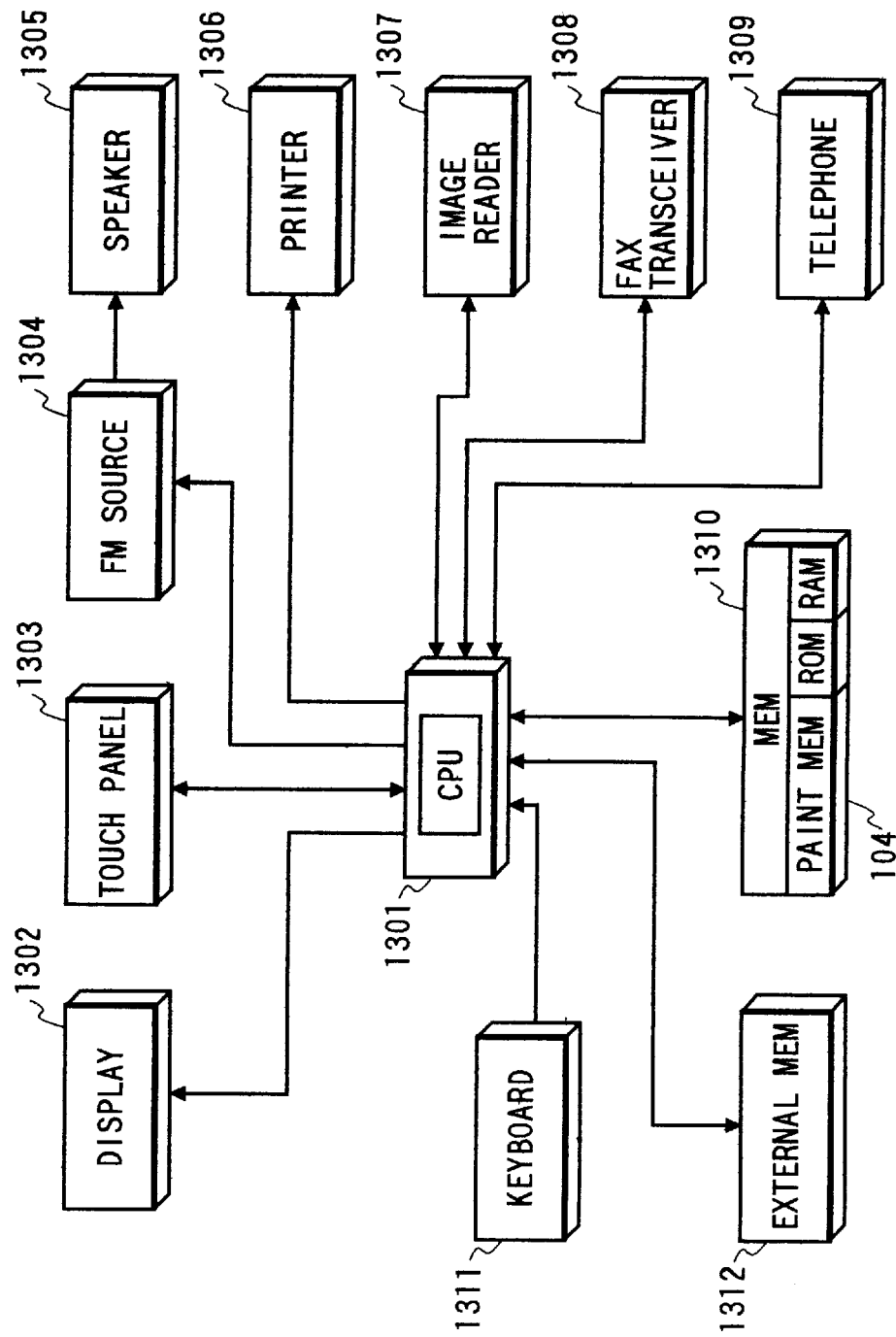
FIG. 13 is a block diagram showing an information processing system in which an output apparatus of the present invention is incorporated.

FIG. 13 is a schematic block diagram showing a case that the recording apparatus according to the present invention is used as an information processing apparatus combining functions as word processor, personal computer, facsimile and copy machine.

In the drawing, a reference numeral 1301 denotes a controller for controlling operation of the whole apparatus. The controller 1301 includes a CPU like a microprocessor and every kind of I/O port, so that the control is executed by outputting and inputting a control signal or a data signal to and from each unit. A display 1302 displays every kind of menu or document information and image data read by an image reader 1307 on a display screen. A transparent, impact type touch panel 1303 is then provided on the display 1302 and is used to input an item or a coordinate position on the display 1302 by touching a desired item or position with a finger.

An FM (Frequency Modulation) sound source 1304 reads out sound information created with a music editor or the like and digitally stored in a memory 1310 or an external memory 1312, so that the FM modulation is performed by reading out the sound information from the memory. An electric signal from the FM source 1304 is inverted by a speaker 1305 into an audible sound. On the other hand, a printer 1306, to which the recording apparatus according to the present invention is applied, is used as an output terminal of the wordprocessor, personal computer, facsimile and copy machine.

The image reader 1307 which reads and inputs document data photo-electrically is provided on the way of the document traveling route for reading every kind of document including fax and copy documents. A facsimile (fax) transceiver 1308 has an interface with the outside and is operative to perform fax transmission of the document data read by the image reader 1307 and to receive and decode a facsimile signal sent to the fax transceiver 1308.

Then, a telephone 1309 has every kind of telephone function such as a normal calling function and an answering machine's function.

The memory 1310 includes the ROM storing the program related to the aforementioned flowcharts, a system program, a manager program, other application programs, character fonts, dictionaries, etc., application programs loaded from an external memory 1312 and document information, a video RAM and such.

A keyboard 1311 is used for inputting document information and every kind of command.

The external memory 1312 uses a floppy disc, a hard disc or the like as a recording medium for storing document information, music or speech information, application programs for user and such.

Figure 14:
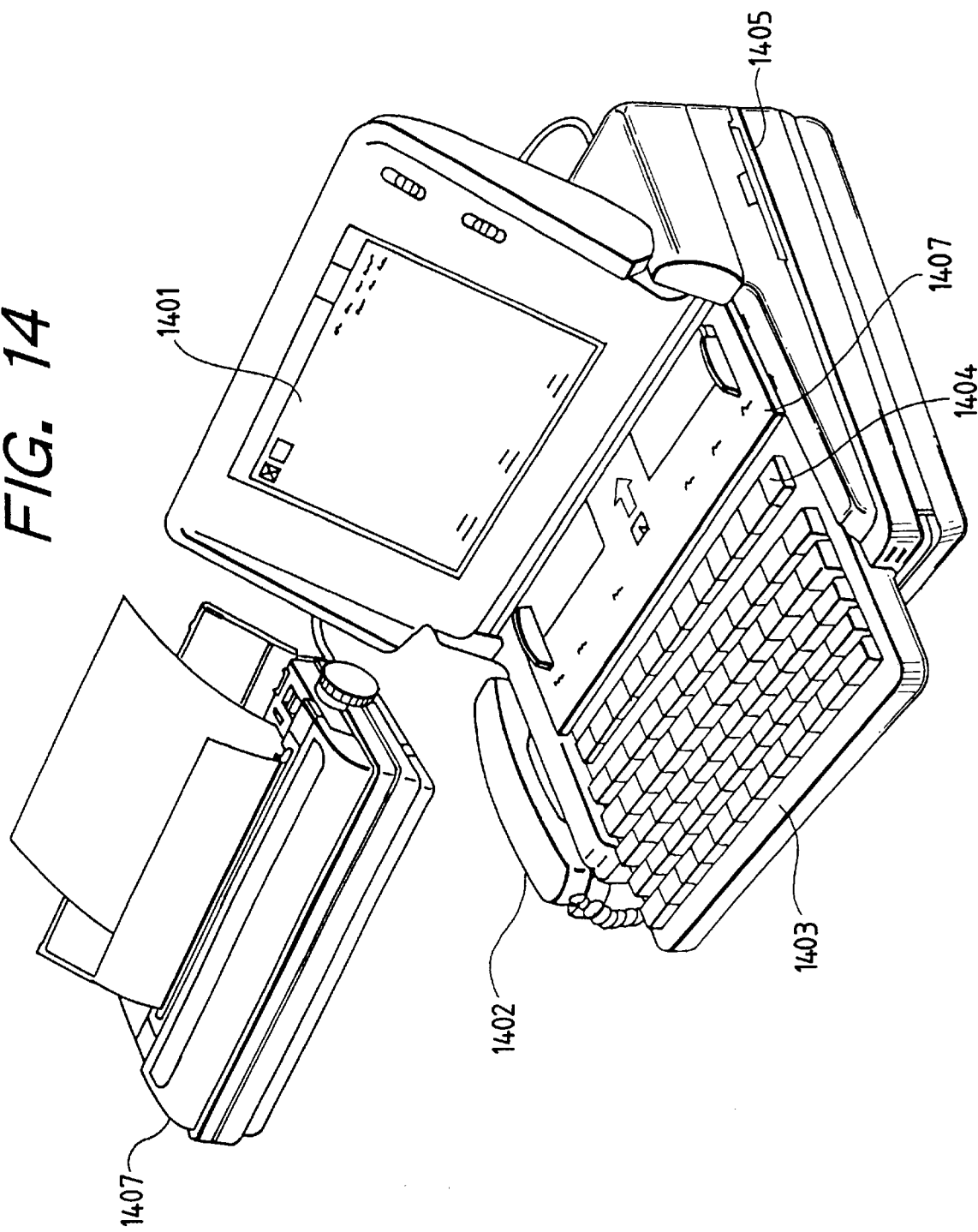
FIG. 14 is a schematically general view of the information processing system shown in FIG. 13.

FIG. 14 is a schematically general view of the information processing system shown in FIG. 13.

In the drawing, a flat panel display 1401 of a liquid crystal type displays every kind of menu, graphic information, document information and such. The touch panel 1303 is provided on the display 1401 so as to input coordinates or desired items to be selected by touching the surface of the touch panel with a finger. The key board 1403 is removably connected through a cable to the information processing apparatus so that every kind of document information and data to be processed can be input. The key board 1403 is provided with alphabetical keys as well as every kind of function key 1404. As an aside, a reference numeral 1405 indicates an insertion port for inserting a floppy disc into the external memory 1312.

A paper tray 1406 is used to put thereon a document to be read by the image reader 1307, and the read document is ejected from the back side of the apparatus. On the other hand, the document received through the facsimile function is printed out from an ink-jet printer 1407.

The display 1302 may be a CRT type, but preferably a flat-panel type liquid-crystal display employing a high dielectric liquid crystal for the purpose of making the apparatus small, thin and light.

When using the information processing apparatus as a personal computer or a word processor, all the information input through the key board 1311 is processed by the controller 1301 according to a prescribed program and output as an image to the printer 1306.

If used as a fax receiver, fax information input from the fax transceiver 1308 through a communication channel is received and processed by the controller 1301 according to a prescribed program and output as a received image to the printer 1306.

If used as a copy machine, a document to be copied is read by the image reader 1307 and output as a copy image to the printer 1306 through the controller 1301. Here, when using it as a fax transmitter, the document read by the image reader 1307 is transmitted to the communication channel through the fax transceiver 1308 after the controller 1301 has processed and arranged the read-out document for fax transmission according to a prescribed program.

Figure 15:
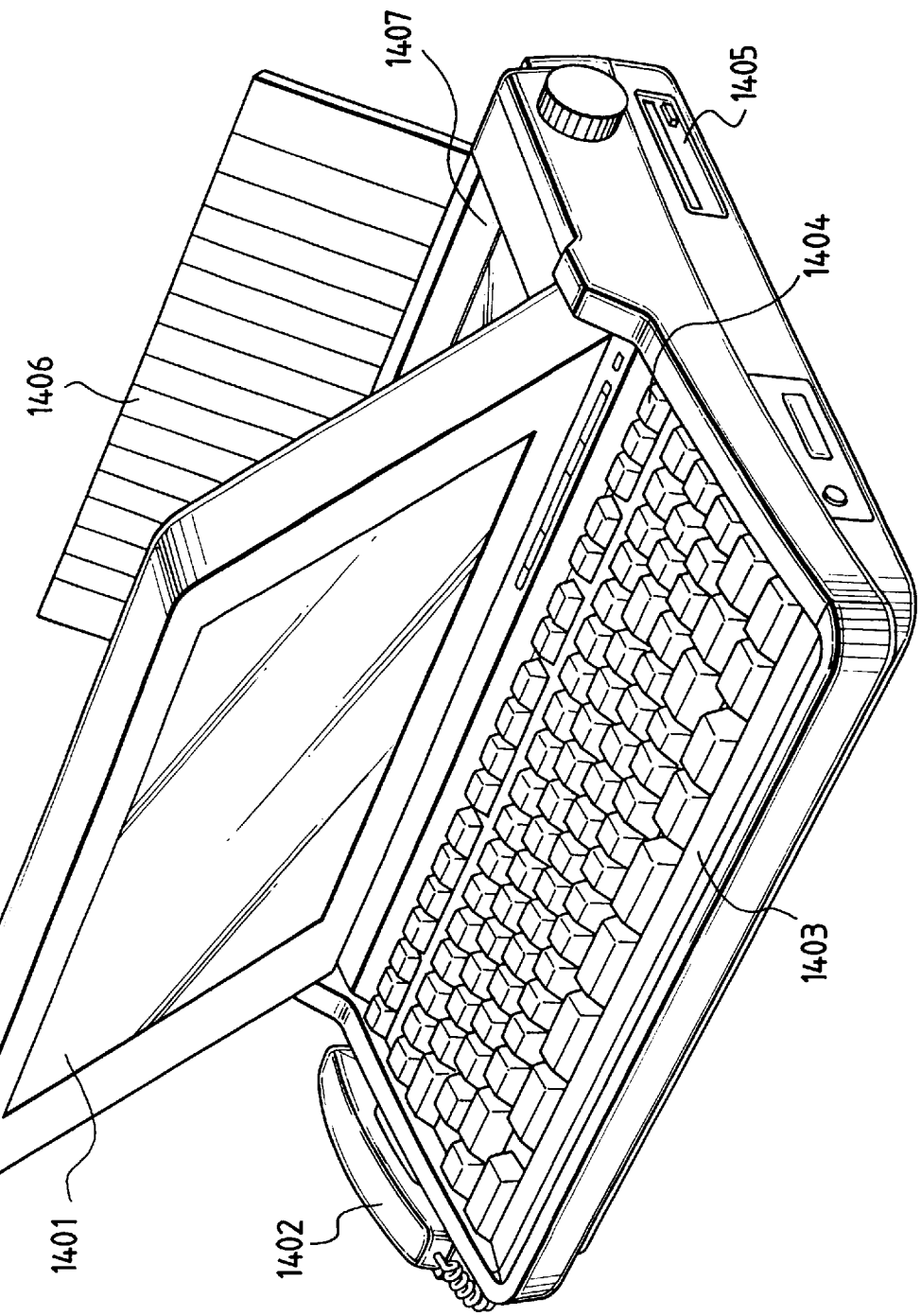
FIG. 15 is a schematically general view of an ink-jet printer built-in type information processing apparatus.

The information processing apparatus may be an ink-jet printer built-in type apparatus as shown in FIG. 15. In this case, the portability of the apparatus can be made higher. In FIG. 15, portions having the same function as those in FIG. 14 are given the same numerals.

The above-mentioned recording apparatus according to the present invention is applied to a multi-functional information processing apparatus, so that a high-quality recording image can be obtained at a high speed but with a low noise, thereby improving the functions of the information processing apparatus.

Further, in the embodiments, the processing for clearing an overlapped pattern can be performed based on only a drawing target pattern without determining whether old and new bit patterns overlap each other.

As described above, the present invention provides an output apparatus which outputs color images bit-mapped in each color to a plurality of output memories according to record information, in which a flag is set in each color by a prescribed range, the flag identifying whether to draw a bit-mapped image to the corresponding output memory, and the flag set such above is memorized and stored, so that the flag is referred before each output memory is cleared at each time of bit mapping, and so that determination is made as to whether to clear the output memory based on the flag reference. Accordingly, the unnecessary memory clear processing can be omitted, and this allows the output apparatus to save the bit mapping time effectively.

What is claimed is:

1. An output control apparatus comprising:
   drawing means for drawing an image on a memory based on data received from an external apparatus;
   clearing means for executing a memory clear process on the memory;
   discriminating means for discriminating whether an image has been drawn on the memory by said drawing means; and
   control means for controlling said clearing means not to execute the memory clear process prior to drawing of a new image by said drawing means if said discriminating means discriminates that no image has been drawn on the memory, and controlling said clearing means to execute the memory clear process prior to drawing of a new image by said drawing means if said discriminating means discriminates that an image has been drawn on the memory.

2. An output control apparatus according to claim 1, wherein said drawing means draws an image on the memory by turning on bits of the memory corresponding to the image and wherein said clearing means executes the memory clear process by turning bits of the memory off.

3. An output control apparatus according to claim 1, further comprising print means for printing data based on the image drawn on the memory by said drawing means.

4. An output control apparatus according to claim 3, wherein said print means comprises an ink jet printer.

5. An output control apparatus according to claim 1, wherein said discriminating means performs a discrimination process using a flag which is turned on after an image has been drawn on the memory by said drawing means, and wherein said control means controls said clearing means not to execute the memory clear process prior to drawing of a new image if the flag is off and controls said clearing means to execute the memory clear process prior to drawing of a new image if the flag is on.

6. An output control apparatus according to claim 1, wherein the memory comprises memory sections corresponding to respective color components.

7. A method executed by an output control apparatus comprising drawing means for drawing an image on a memory based on data received from an external apparatus, and clearing means for executing a memory clear process on the memory, said method comprising the steps of:
   discriminating whether an image has been drawn on the memory by the drawing means; and
   controlling the clearing means not to execute the memory clear process prior to drawing of a new image by the drawing means if said discriminating step discriminates that no image has been drawn on the memory, and controlling the clearing means to execute the memory clear process prior to drawing of a new image by the drawing means if said discriminating step discriminates that an image has been drawn on the memory.

8. A method according to claim 7, wherein the drawing means draws an image on the memory by turning on bits of the memory corresponding to the image and wherein the clearing means executes the memory clear process by turning bits of the memory off.

9. A method according to claim 7, further comprising the step of printing data based on the image drawn on the memory by the drawing means.

10. A method according to claim 9, wherein said printing step prints the data using an ink jet printer.

11. A method according to claim 7, wherein said discriminating step performs a discrimination process using a flag which is turned on after an image has been drawn on the memory by the drawing means, and wherein said controlling step controls the clearing means not to execute the memory clear process prior to drawing of a new image if the flag is off and controls the clearing means to execute the memory clear process prior to drawing of a new image if the flag is on.

12. A method according to claim 7, wherein the memory comprises memory sections corresponding to respective color components.

13. A computer-readable memory medium for storing a program for a method executed by an output control apparatus comprising drawing means for drawing an image on a memory based on data received from an external apparatus, and clearing means for executing a memory clear process on the memory, said method comprising the steps of:
   discriminating whether an image has been drawn on the memory by the drawing means; and
   controlling the clearing means not to execute the memory clear process prior to drawing of a new image by the drawing means if said discriminating step discriminates that no image has been drawn on the memory, and controlling the clearing means to execute the memory clear process prior to drawing of a new image by the drawing means if said discriminating step discriminates that an image has been drawn on the memory.

14. A memory medium according to claim 13, wherein the drawing means draws an image on the memory by turning on bits of the memory corresponding to the image and wherein the clearing means executes the memory clear process by turning bits of the memory off.

15. A memory medium according to claim 13, further comprising the step of printing data based on the image drawn on the memory by the drawing means.

16. A memory medium according to claim 15, wherein said printing step prints the data using an ink jet printer.

17. A memory medium according to claim 13, wherein said discriminating step performs a discrimination process using a flag which is turned on after an image has been drawn on the memory by the drawing means, and wherein said controlling step controls the clearing means not to execute the memory clear process prior to drawing of a new image if the flag is off and controls the clearing means to execute the memory clear process prior to drawing of a new image if the flag is on.

18. A memory medium according to claim 13, wherein the memory comprises memory sections corresponding to respective color components.

* * * * *

UNITED STATES PATENT AND TRADEMARK OFFICE
CERTIFICATE OF CORRECTION

PATENT NO.  :  5,805,184

DATED       :  September 8, 1998

INVENTOR(S) :  Norikazu HORIIKE

It is certified that error appears in the above-identified patent and that said Letters Patent is hereby corrected as shown below:

COLUMN 2:

Line 49, "referred" should read --referred to--.

COLUMN 6:

Line 4, "is" should read --are--; and
    Line 34, "has," should read --have,--.

COLUMN 8:

Line 1, "is" should read --are--.

COLUMN 9:

Line 33, "the" should read --to the--.

COLUMN 11:

Line 66, "Nos." should read --No.--.

UNITED STATES PATENT AND TRADEMARK OFFICE
CERTIFICATE OF CORRECTION

PATENT NO. : 5,805,184

DATED : September 8, 1998

INVENTOR(S) : Norikazu HORIIKE

It is certified that error appears in the above-identified patent and that said Letters Patent is hereby corrected as shown below:

COLUMN 12:

Line 22, "Nos." should read --No.--; and
    Line 36, "Nos." should read --No.--.

COLUMN 15:

Line 35, "such" should read --as--.
    Line 36, "referred" should read --referred to--.

Signed and Sealed this

Twenty-eighth Day of September, 1999

Attest:

Q. TODD DICKINSON

*Attesting Officer*     *Acting Commissioner of Patents and Trademarks*